United States Patent
Fujita

(10) Patent No.: US 9,710,378 B2
(45) Date of Patent: *Jul. 18, 2017

(54) WRITING AN ADDRESS CONVERSION TABLE FOR NONVOLATILE MEMORY WEAR LEVELING

(71) Applicant: International Business Machines Corporation, Armonk, NY (US)

(72) Inventor: Norio Fujita, Kouka (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/346,874

(22) Filed: Nov. 9, 2016

(65) Prior Publication Data

US 2017/0052888 A1    Feb. 23, 2017

Related U.S. Application Data

(63) Continuation of application No. 14/723,611, filed on May 28, 2015.

(30) Foreign Application Priority Data

May 29, 2014    (JP) .................. 2014-111591

(51) Int. Cl.
  *G06F 12/00*    (2006.01)
  *G06F 12/02*    (2006.01)
  *G06F 3/06*    (2006.01)

(52) U.S. Cl.
  CPC .......... *G06F 12/0246* (2013.01); *G06F 3/065* (2013.01); *G06F 3/0616* (2013.01);
  (Continued)

(58) Field of Classification Search
  CPC ......... G06F 12/0246; G06F 2212/7211; G06F 2212/7201; G06F 2212/1036;
  (Continued)

(56) References Cited

U.S. PATENT DOCUMENTS

| 2009/0113112 A1* | 4/2009 | Ye .................. G06F 12/0246 711/102 |
| 2011/0231713 A1* | 9/2011 | Takada ............ G06F 12/0246 714/54 |
| 2015/0347292 A1 | 12/2015 | Fujita |

FOREIGN PATENT DOCUMENTS

| JP | 06083686 A | 3/1994 |
| JP | H107248978 A | 9/1995 |

(Continued)

OTHER PUBLICATIONS

Qureshi et al., "Enhancing Lifetime and Security of PCM-Based Main Memory with Start-Gap Wear Leveling," Proceedings of the 42nd Annual IEEE/ACM International Symposium on Microarchitecture, 2009, pp. 1-10.

(Continued)

*Primary Examiner* — David X Yi
*Assistant Examiner* — Alan Otto
(74) *Attorney, Agent, or Firm* — Jared L. Montanaro

(57) ABSTRACT

An apparatus configured to write, in a non-volatile memory, an address conversion table for wear leveling of the non-volatile memory includes a holding unit configured to hold a first address conversion table for wear leveling of a first block of the non-volatile memory, a second address conversion table for wear leveling of a second block other than the first block of the non-volatile memory, and a third address conversion table for wear leveling of a third block other than the first block of the non-volatile memory; and a writing unit configured to write, in the first block, a replication of the second address conversion table in addition to one replica- (Continued)

tion of the first address conversion table and to write, in the third block, another replication of the first address conversion table in addition to a replication of the third address conversion table.

1 Claim, 6 Drawing Sheets

(52) U.S. Cl.
CPC .......... *G06F 3/0649* (2013.01); *G06F 3/0679* (2013.01); *G06F 2212/1036* (2013.01); *G06F 2212/2022* (2013.01); *G06F 2212/7201* (2013.01); *G06F 2212/7211* (2013.01)

(58) Field of Classification Search
CPC ...... G06F 3/0679; G06F 3/065; G06F 3/0649; G06F 3/0616; G06F 2212/2022
See application file for complete search history.

(56) References Cited

FOREIGN PATENT DOCUMENTS

| JP | H107302176 A | 11/1995 |
|---|---|---|
| JP | H110312338 A | 11/1998 |
| JP | 2002182988 A | 6/2002 |
| JP | 2004127185 A | 4/2004 |
| JP | 2004139503 A | 5/2004 |
| JP | 2007018499 A | 1/2007 |
| JP | 2009512022 A | 3/2009 |
| JP | 2010066914 A | 3/2010 |
| JP | 2012203925 A | 10/2012 |
| JP | 2013016147 A | 1/2013 |
| JP | 2013196155 A | 9/2013 |
| JP | 2013257679 A | 12/2013 |
| WO | 2012074554 A2 | 6/2012 |

OTHER PUBLICATIONS

Fujita, N. "Apparatus and Method for Writing Address Conversion Table," Japan Patent Application 2014-111591, filed May 29, 2014, (English translation).

Decision to Grant a Patent, Japan Application No. 2014-111591, May 2, 2016, 6 pgs., original and translated versions.

List of IBM Patents or Patent Applications Treated as Related, Nov. 8, 2016, 2 pgs.

* cited by examiner

Figure 1

WRITING AN ADDRESS CONVERSION TABLE FOR NONVOLATILE MEMORY WEAR LEVELING

FOREIGN PRIORITY

This application claims priority to Japanese Patent Application No. 2014-111591, filed May 29, 2014, and all the benefits accruing therefrom under 35 U.S.C. §119, the contents of which in its entirety are herein incorporated by reference.

BACKGROUND

The present invention relates to an apparatus and a method for writing an address conversion table. Particularly, the present invention relates to an apparatus and a method for writing, in a non-volatile memory, an address conversion table for wear leveling of the non-volatile memory.

A non-volatile memory, such as a flash memory and a phase-change memory, has a limitation in the number of rewrites of data. As a result, the data cannot be rewritten in a cell with the number of rewrites exceeding the limitation, or the data is erased (inverted), leading to the end of the lifetime.

Therefore, if rewrites are concentrated on a specific cell, the cell quickly (for example, in about several seconds) reaches the end of lifetime. Thus, the numbers of rewrites in cells are leveled to prevent the concentration of rewrites in a specific cell. The leveling of the numbers of rewrites is generally called wear leveling. The wear leveling is a process of using an address conversion table to dynamically convert a physical address provided from a CPU or the like to a memory system into an internal address for actual writing of data in order to level the numbers of rewrites in the cells.

Here, a simple, new and effective start gap system is known as a system of wear leveling (for example, see the publication of Moinuddin K. Qureshi, Michele Franchescini, Vijayalakshmi Srinivasan, Luis Lastras, Bulent Abali, and John Karidis, "Enhancing Lifetime and Security of PCM-Based Main Memory with Start-Gap Wear Leveling", IBM Research, [online], [searched Apr. 22, 2014], Internet <URL: http://researcher.watson.ibm.com/researcher/files/us-moinqureshi/papers-sgap.pdf>).

Qureshi, et al. discloses a start-gap system using algebraic mapping between logical addresses and physical addresses, the start-gap system including two registers Start and Gap as well as an additional memory line GapLine for facilitating data migration, Gap tracking the number of lines reshuffled in the memory, Start keeping track of the numbers of reshuffles of all lines in the memory.

Further, an example of a known technique described in a patent application includes a technique of reducing exhaustion of a flash memory (for example, see JP2013-196155A).

JP2013-196155A discloses that when a snapshot condition is met, a management table is saved as a snapshot from a first storage unit to a first block of a second storage unit, a pointer indicating the save location of the management table is saved in a write unit in a second block of the second storage unit, and part of the management table is saved in a non-written area in the write unit of the second block that saves the pointer.

Furthermore, techniques of updating an address conversion table are also known (for example, see JP2007-18499A and WO2012/074554).

JP2007-18499A discloses a storage apparatus including: a 2-chip flash memory that can be accessed in parallel; a page register that acquires data from the flash memory in parallel and that temporarily stores the data; and a control circuit including a RAM provided with an address conversion table for managing contrast between logical addresses and physical addresses on the basis of data stored in parallel in the page register, wherein data is rewritten by update of the address conversion table and addition to a storage medium.

WO2012/074554 discloses restoration of a transaction log including: checking some entries saved in the transaction log to determine a writing pattern based on the entries; reading a memory based on the writing pattern; updating the transaction log with information associated with data read from the memory based on the writing pattern; and updating a logical address (LA) table by using the transaction log.

Further, techniques of duplicating and storing data are also known.

JP7-248978A discloses a non-volatile memory, wherein a first latest write signal is generated and stored after writing of data in a first memory is finished, the same data as the data written in the first memory is written in a second memory, a second latest write signal is generated and stored, a check code indicating whether the latest write signal is normally stored in the memory is generated and stored, and when the check code stored in the memory is determined to be normal, the data is read from the first memory or the second memory according to the latest write signal stored in the memory.

JP10-312338A discloses a memory control apparatus, wherein in address conversion from a virtual address to a physical address, a page table walk process generates two physical addresses of primary and shadow to duplicate data written in a physical memory, and when a failure occurs, the address in which effective data remains is used to enable recovery from the failure.

JP2004-139503A discloses a storage apparatus, wherein the same data is written in a different storage medium when an instruction of mirror writing is input, management information of mirror writing (data ID, mirror writing flag, logical address, and the like) is generated, correct data is read from another recording medium if one recording medium is broken when data is read, and at this point, the correct data read from the other recording medium is rewritten in a normal area in place of the data of the broken recording medium.

Further, a technique of causing a plurality of flash EEPROMs to execute write operation at the same time is also known (for example, see Patent Literature 7).

JP7-302176A discloses a semiconductor disk apparatus, wherein a NAND bus interface independently receives sixteen ready/busy signals from the flash EEPROMs to manage the operation state of each flash EEPROM.

SUMMARY

In one embodiment, an apparatus configured to write, in a non-volatile memory, an address conversion table for wear leveling of the non-volatile memory includes a holding unit configured to hold a first address conversion table for wear leveling of a first block of the non-volatile memory, a second address conversion table for wear leveling of a second block other than the first block of the non-volatile memory, and a third address conversion table for wear leveling of a third block other than the first block of the non-volatile memory; and a writing unit configured to write, in the first block, a replication of the second address conversion table in addition to one replication of the first address conversion table and to write, in the third block, another replication of the first address conversion table in addition to a replication of the third address conversion table.

In another aspect, a non-volatile memory includes a plurality of blocks, wherein a first block of the plurality of blocks stores, in a predetermined area, one replication of a first address conversion table for wear leveling of the first block and a replication of a second address conversion table for wear leveling of a second block other than the first block of the plurality of blocks; and a third block other than the first block of the plurality of blocks stores, in a predetermined area, a replication of a third address conversion table for wear leveling of the third block and another replication of the first address conversion table.

In another aspect a system includes a non-volatile memory and a control apparatus configured to control the non-volatile memory, the non-volatile memory including a first block; a second block other than the first block; and a third block other than the first block; the control apparatus including a holding unit configured to hold a first address conversion table for wear leveling of the first block, a second address conversion table for wear leveling of the second block, and a third address conversion table for wear leveling of the third block; and a writing unit configured to write, in the first block, a replication of the second address conversion table in addition to one replication of the first address conversion table and to write, in the third block, another replication of the first address conversion table in addition to a replication of the third address conversion table.

In another embodiment, a method of writing, in a non-volatile memory, an address conversion table for wear leveling of the non-volatile memory includes writing, in a first block, one replication of a first address conversion table for wear leveling of the first block of the non-volatile memory; writing, in the first block, a replication of a second address conversion table for wear leveling of a second block other than the first block of the non-volatile memory; writing, in a third block, a replication of a third address conversion table for wear leveling of the third block other than the first block of the non-volatile memory; and writing, in the third block, another replication of the first address conversion table.

BRIEF DESCRIPTION OF THE DRAWINGS

FIG. 1 is diagram showing an outline of a start-gap system used in an embodiment of the present invention;

DETAILED DESCRIPTION

Figure 2:
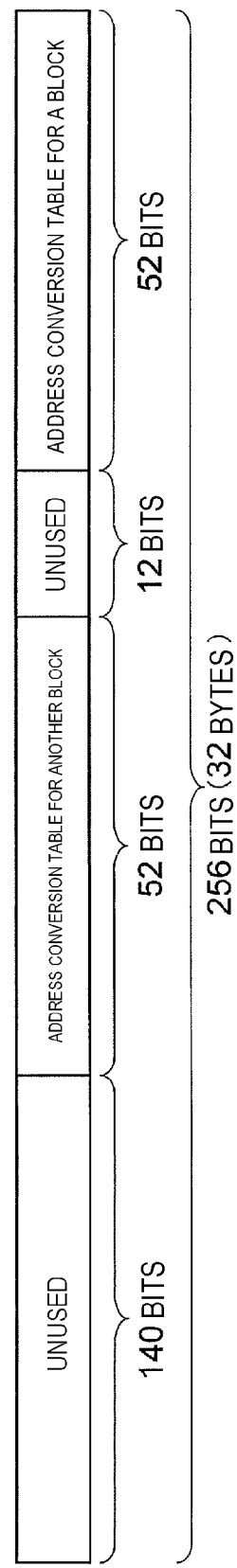
FIG. 2 is a diagram showing an example of a format of an address conversion table according to an embodiment of the present invention.

In addition to the above described problems, the address conversion table is also held in a non-volatile memory (area in which address is not converted). Therefore, if an error occurs in this area, data corresponding to the address with the error cannot be read. Further, when data is rewritten, the data indicated by the wrong address conversion table breaks down, and in the worst case, the data of the entire memory system may be broken.

However, none of the above described techniques solves these problems. Accordingly, embodiments of the present invention improve reliability of a non-volatile memory in a system of writing, in the non-volatile memory, an address conversion table for wear leveling.

In particular, embodiments of the present invention provide an apparatus configured to write, in a non-volatile memory, an address conversion table for wear leveling of the non-volatile memory, the apparatus including: a holding unit configured to hold a first address conversion table for wear leveling of a first block of the non-volatile memory, a second address conversion table for wear leveling of a second block other than the first block of the non-volatile memory, and a third address conversion table for wear leveling of a third block other than the first block of the non-volatile memory; and a writing unit configured to write, in the first block, a replication of the second address conversion table in addition to one replication of the first address conversion table and to write, in the third block, another replication of the first address conversion table in addition to a replication of the third address conversion table.

In the apparatus, after changing arrangement of data in the first block for the wear leveling of the first block, the writing unit may write, in the third block, the other replication of the first address conversion table updated according to the change and then write, in the first block, the one replication of the first address conversion table updated according to the change. In this case, the writing unit may write, in the third block, the other replication of the first address conversion table updated according to the change, based on bank interleave following the change in the arrangement of the data in the first block.

Further, the writing unit may write, in a predetermined area of the first block, the one replication of the first address conversion table and the replication of the second address conversion table by single write operation and write, in a predetermined area of the third block, the replication of the third address conversion table and the other replication of the first address conversion table by single write operation.

Furthermore, the holding unit may hold the first address conversion table if the one replication and the other replication coincide when the apparatus is activated and hold one of the one replication and the other replication without an error as the first address conversion table if the one replication and the other replication do not coincide. Alternatively, the holding unit may hold the first address conversion table if the one replication and the other replication coincide when the apparatus is activated and hold information indicating prohibition of writing in the first block if the one replication and the other replication do not coincide.

Further, the present invention provides a non-volatile memory including a plurality of blocks, wherein a first block of the plurality of blocks stores, in a predetermined area, one replication of a first address conversion table for wear leveling of the first block and a replication of a second address conversion table for wear leveling of a second block other than the first block of the plurality of blocks, and a third block other than the first block of the plurality of blocks stores, in a predetermined area, a replication of a third address conversion table for wear leveling of the third block and another replication of the first address conversion table.

In the non-volatile memory, the second block and the third block may be the same block, and the second address conversion table and the third address conversion table may be the same address conversion table.

Furthermore, embodiments of the present invention provide a system including a non-volatile memory and a control apparatus configured to control the non-volatile memory, the non-volatile memory including: a first block; a second block other than the first block; and a third block other than the first block, the control apparatus including: a holding unit configured to hold a first address conversion table for wear leveling of the first block, a second address conversion table for wear leveling of the second block, and a third address conversion table for wear leveling of the third block; and a writing unit configured to write, in the first block, a replication of the second address conversion table in addition to one replication of the first address conversion table and to write, in the third block, another replication of the first address conversion table in addition to a replication of the third address conversion table.

Furthermore, embodiments of the present invention provide a method of writing, in a non-volatile memory, an address conversion table for wear leveling of the non-volatile memory, the method including the steps of: writing, in a first block, one replication of a first address conversion table for wear leveling of the first block of the non-volatile memory; writing, in the first block, a replication of a second address conversion table for wear leveling of a second block other than the first block of the non-volatile memory; writing, in a third block, a replication of a third address conversion table for wear leveling of the third block other than the first block of the non-volatile memory; and writing, in the third block, another replication of the first address conversion table.

According to embodiments of the present invention, reliability of a non-volatile memory can be improved in a system of writing, in the non-volatile memory, an address conversion table for wear leveling.

Hereinafter, an embodiment of the present invention will be described in detail with reference to the attached drawings.

The present embodiment is designed to hold a plurality of address conversion tables in a phase-change memory, in which write granularity is as small as, for example, several dozen cells, and deletion operation as in a flash memory is not necessary. This improves reliability of a memory system that performs wear leveling, without increasing the overhead of the system.

Here, a start-gap system suitable for a phase-change memory is used as a system of wear leveling, wherein the address conversion tables can be small. This is a system in which the number of rewrites is managed in each small area, but the address conversion table is provided in each block. This system can be used to reduce the overhead of a control circuit.

Figure 1:
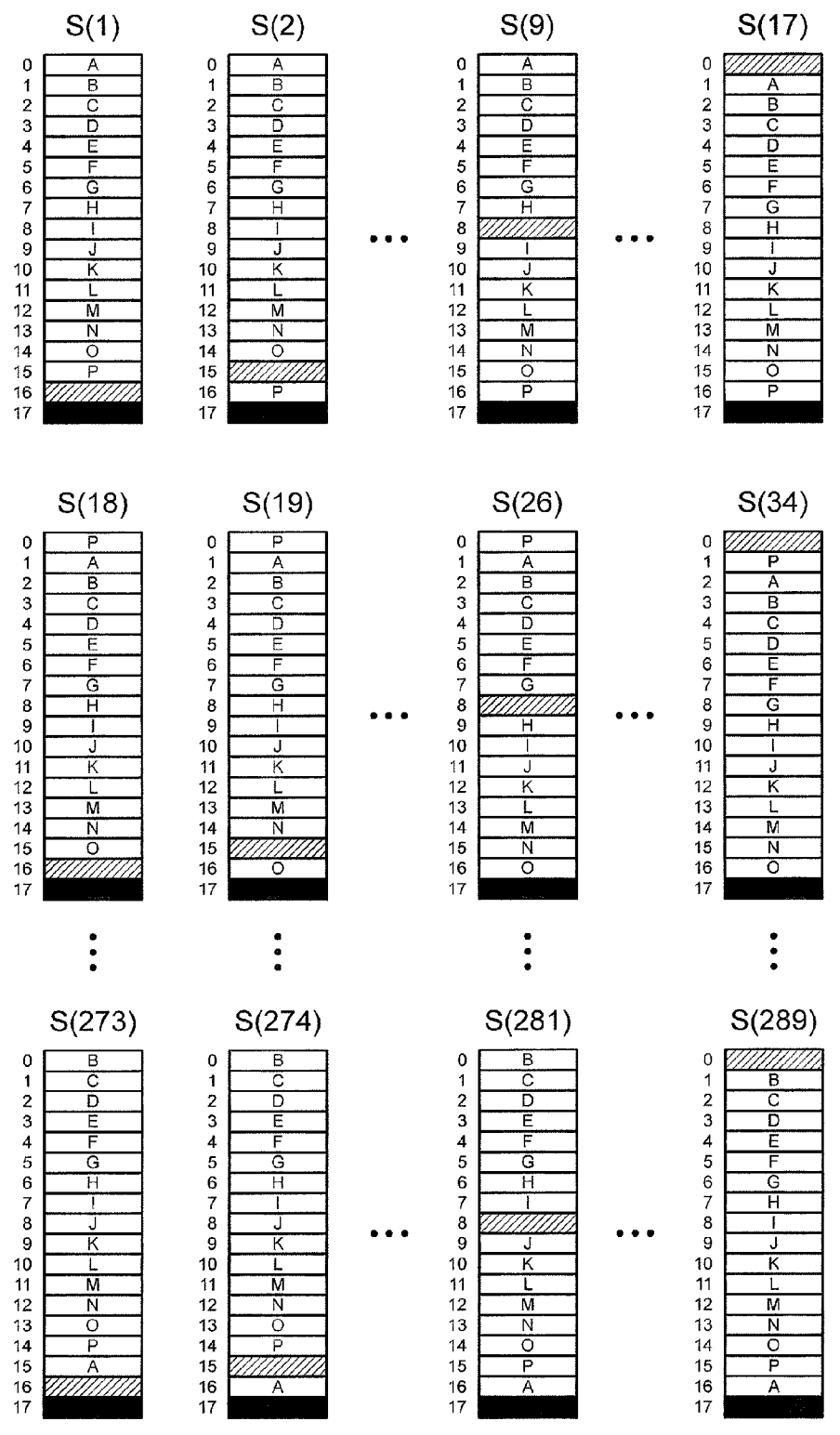

FIG. 1 is a diagram showing an outline of the start-gap system. FIG. 1 provides seventeen data storage areas in one block, including one free area. In FIG. 1, a hatched area is a free area, and areas A to P are data storage areas other than the free area.

In the start-gap system, one block exhibits a plurality of states in relation to the arrangement of the data storage areas. In FIG. 1, S(1), S(2), . . . , S(289) are illustrated as a plurality of states.

First, it is assumed that the state of the block is S(1). When the number of rewrites reaches a threshold for the first time in this state, the free area and an area P are switched, and the state of the block is changed to S(2). More specifically, the area that has been the area P becomes a free area. Further, when the number of rewrites reaches the threshold for the second time, the free area and an area O are switched. In this way, the free area and the adjacent data storage area are sequentially switched every time the number of rewrites reaches the threshold, and the state of the block is changed to S(17) when the number of rewrites reaches the threshold for the sixteenth time. Therefore, the free area moves to the head of the block.

Next, when the number of rewrites reaches the threshold for the seventeenth time, the state of the block is changed to S(18). More specifically, although the location of the free space is the same as in S(1), the locations of all data storage areas are shifted by one space compared to S(1). Subsequently, when the number of rewrites reaches the threshold for the thirty-third time, the state of the block is changed to S(34), and the free area moves to the head of the block again.

Hereinafter, it is assumed that the operation of moving the free area to the head of the block after the number of rewrites reaches the threshold seventeen times is repeated fifteen times. More specifically, it is assumed that counting from S(1), the number of rewrites has reached the threshold for the 288th (=17×17−1) time. Consequently, the state of the block is changed to S(289). Subsequently, when the number of rewrites reaches the threshold for the 289th (=17×17) time, the state of the block returns to S(1).

By the way, an area of an address 17 is reserved in the present embodiment, and this is set as an address conversion table storage area. In FIG. 1, the address conversion table storage area is indicated in black. Further, as is recognized from FIG. 1, the address conversion table storage area and the free area are not switched.

Here, it is assumed that the address conversion table holds identification information for identifying the plurality of states shown in FIG. 1. Because the identification information is held, when writing in a data storage area is instructed, the writing can be performed at the location of the data storage area in the state identified by the identification information. Although a combination of the address of the area A and the address of the free area may be held as the identification information for example, serial numbers (1, 2, . . . , 289) provided to the plurality of states shown in FIG. 1 are held in the present embodiment.

Further, it is assumed in the present embodiment that the phase-change memory is divided into a plurality of banks as in a DRAM. Although only one block is described in FIG. 1, a plurality of blocks actually exist on a plurality of banks.

In the present embodiment, when an address conversion table for address conversion in a block (address conversion table for a block) is stored, an original is stored in the block, and a copy is stored in another block. This means that the block stores the original of the address conversion table for a block and a copy of an address conversion table for address conversion in another block (address conversion table for another block). In this case, the original of the address conversion table for a block and the copy of the address conversion table for another block are merged and stored in the address conversion table storage area of the block. According to the configuration, two address conversion tables can be updated at the same time in one write operation.

Here, a configuration of the address conversion table will be described.

When one block has a configuration as shown in FIG. 1, there are 289 (=17×17) states in relation to the arrangement of the data storage area of the block. Therefore, one address conversion table can be generated by information of nine bits. Further, the address conversion tables for two blocks are generated by information of eighteen bits.

Furthermore, a 16G byte DIMM (Dual Inline Memory Module) including eight memories of 16G bits will be considered as another specific example.

First, it is assumed that the DIMM includes eight banks. It is also assumed that the block size is equal to the bank size. Thus, the block size is 2G (=16G/8) bytes.

Further, the write granularity (burst size) of the phase-change memory is a size equivalent to the cache line of the CPU as in a SDRAM (Synchronous DRAM), even if the granularity is the minimum granularity based on the assumption that the memory is used as a system memory. For example, the write granularity is 32 to 64 bytes in a memory for x86 CPU. More specifically, if the size is 32 bytes or smaller, the information is written in one write operation. Therefore, the burst size is set to 32 bytes. Then, it is assumed that the size of the data storage area is equal to the burst size. Consequently, since each block includes $2^{26}-1$ (2G/32−1) data storage areas, there are about $2^{52}$ states in relation to the arrangement of the data storage areas of each block. Therefore, one address conversion table can be generated by 52 bits. Further, the address conversion tables for two blocks can be generated by 104 bits. As a result, the address conversion tables for two blocks can be within 32 bytes that is the burst size.

FIG. 2 is a diagram showing an example of a format of the address conversion tables in this case. As illustrated, the address conversion tables include a 52-bit address conversion table for a block and a 52-bit address conversion table for another block.

Further, the plurality of banks of the phase-change memory can be generally operated at the same time. Therefore, a copy of the address conversion table can be stored in another block in a bank other than the bank including the block, and continuous writing by bank interleave is possible. Specifically, following the switching operation of the free area and the adjacent data storage area shown in FIG. 1, the copy of the address conversion table indicating the state after the switching operation can be written in another block by the bank interleave.

Figure 3:
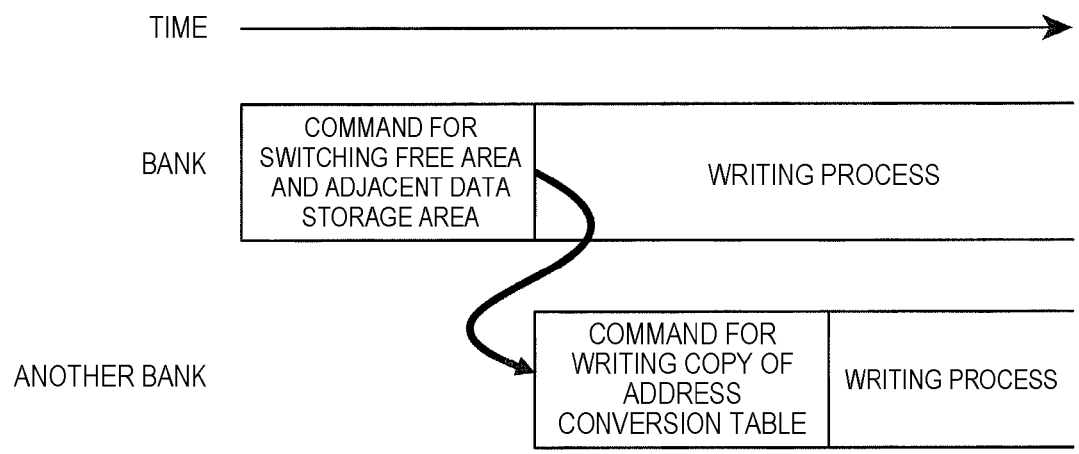
FIG. 3 is a diagram showing continuous writing by bank interleave according to an embodiment of the present invention.

FIG. 3 is a diagram showing continuous writing by the bank interleave. In FIG. 3, the upper stage illustrates a time sequence of a process in a bank, and the lower stage illustrates a time sequence of a process in another bank. In the present embodiment, as shown in FIG. 3, a command for switching the free area and the adjacent data storage area is first processed in the bank, and a writing process based on the command is started. Further, at the start of the writing process, a command for writing a copy of the address conversion table is processed in the other bank. Then, the writing process based on the command is executed in parallel with the writing process in the bank.

Configuration of Memory System of Present Embodiment

Figure 4:
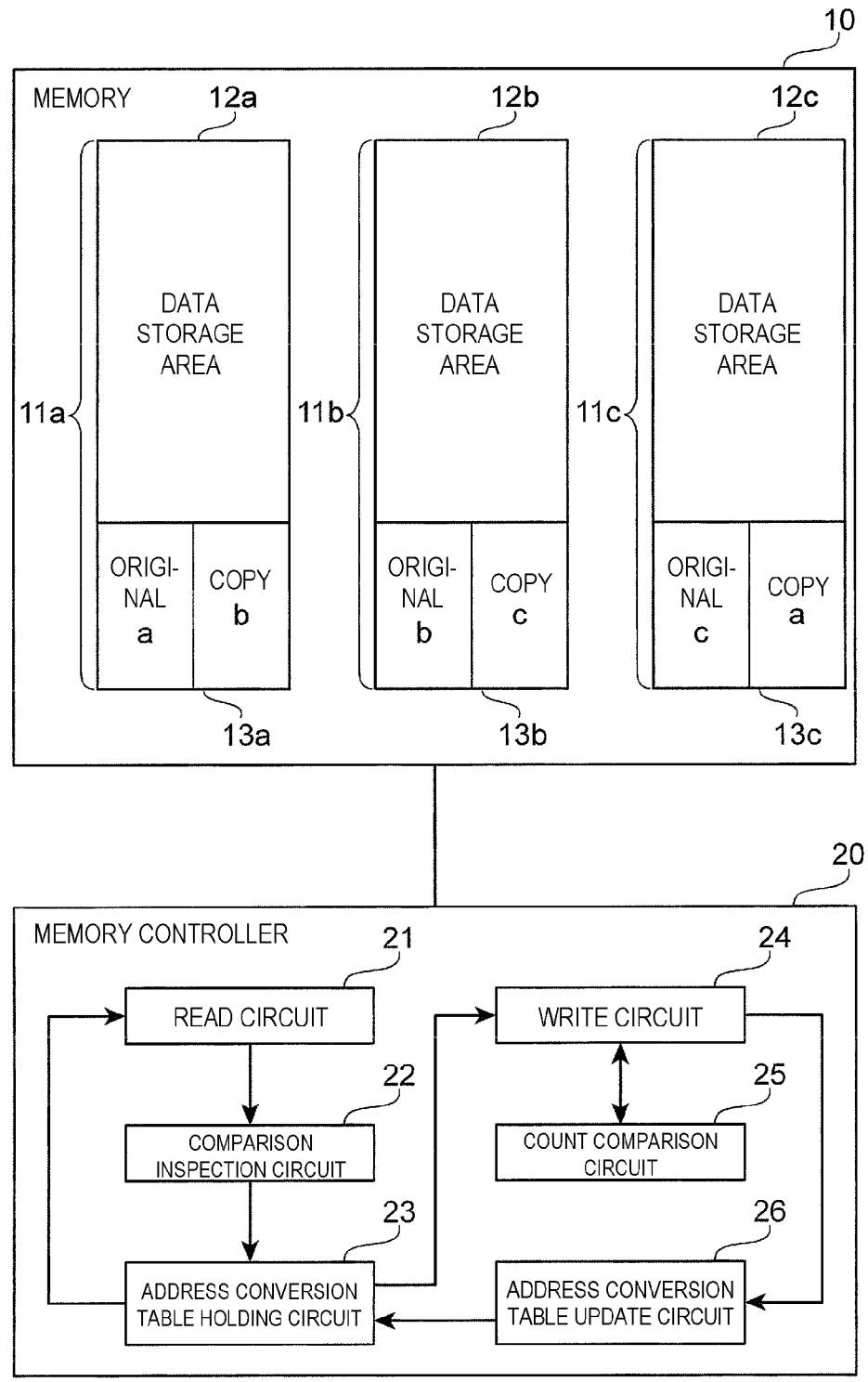
FIG. 4 is a diagram showing an example of entire configuration of a memory system according to an embodiment of the present invention.

FIG. 4 is a diagram showing an example of entire configuration of a memory system according to the present embodiment. As illustrated, the memory system includes a memory 10 and a memory controller 20.

The memory 10 includes blocks 11a, 11b and 11c. The block 11a includes a data storage area 12a and an address conversion table storage area 13a, the block 11b includes a data storage area 12b and an address conversion table storage area 13b, and the block 11c includes a data storage area 12c and an address conversion table storage area 13c.

The blocks 11a, 11b and 11c are equivalent to the block shown in FIG. 1. Note that the blocks 11a, 11b and 11c will be simply called blocks 11 when the blocks are not distinguished. Although the number of blocks 11 is not limited, three blocks 11 are included in the example illustrated here. In the present embodiment, the block 11a is included as an example of a first block, the block 11b is included as an example of a second block, and the block 11c is included as an example of a third block.

The data storage areas 12a, 12b and 12c are equivalent to the data storage areas shown in FIG. 1. However, the data storage areas 12a, 12b, and 12c here include all seventeen data storage areas including one free area shown in FIG. 1. Note that the data storage areas 12a, 12b and 12c will be simply called data storage areas 12 when the data storage areas are not distinguished.

The address conversion table storage areas 13a, 13b and 13c are equivalent to the address conversion table storage area shown in FIG. 1. In this example, an original a that is an original of the address conversion table for the block 11a is stored in the address conversion table storage area 13a, along with a copy b that is a copy of the address conversion table for the block 11b. Further, a copy a that is a copy of the address conversion table for the block 11a is stored in the address conversion table storage area 13c, along with an original c that is an original of the address conversion table for the block 11c. Note that the address conversion table storage areas 13a, 13b and 13c will be simply called address conversion table storage areas 13 when the address conversion table storage areas are not distinguished. In the present embodiment, the address conversion table storage areas 13a, 13b and 13c are provided as an example of predetermined areas. Further, the original a is used as an example of one replication of a first address conversion table, the copy a is used as an example of another replication of the first address conversion table, the copy b is used as an example of a replication of a second address conversion table, and the original c is used as an example of a replication of a third address conversion table.

In this example, the memory 10 includes the blocks 11a, 11b and 11c, the original a and the copy b are stored in the block 11a, an original b and a copy c are stored in the block 11b, and the original c and the copy a are stored in the block 11c. However, the arrangement is not limited to this. For example, if the memory 10 includes four or more blocks 11, there can be various combinations of the original and the copy stored in each block. In an extreme example in which the memory 10 includes the blocks 11a and 11b, the original a and the copy b may be stored in the block 11a, and the original b and the copy a may be stored in the block 11b.

Further, the memory controller 20 includes a read circuit 21, a comparison inspection circuit 22, an address conversion table holding circuit 23, a write circuit 24, a count comparison circuit 25, and an address conversion table update circuit 26.

The read circuit 21 reads the original and the copy of the address conversion table from the block 11 of the memory 10.

The comparison inspection circuit 22 receives the original and the copy of the address conversion table read by the read circuit 21 to compare the original and the copy and to inspect whether there is an error in the original or the copy.

The address conversion table holding circuit 23 holds one of the original and the copy of the address conversion table received by the comparison inspection circuit 22 according to the result of the comparison and the inspection by the comparison inspection circuit 22. Specifically, as a result of the comparison and the inspection by the comparison inspection circuit 22, if it is recognized that the original and the copy coincide and there is no error in the original and the copy, or if it is recognized that the original and the copy do not coincide but there is no error in the copy, the copy of the address conversion table is held. Further, if it is recognized that the original and the copy do not coincide and there is an error in the copy, but there is no error in the original, the original of the address conversion table is held. Furthermore, if it is recognized that the original and the copy do not coincide and there are errors in both of the original and the copy, an indication that writing in the target block should not be performed is held. In the present embodiment, the address conversion table holding circuit 23 is provided as an example of a holding unit that holds the address conversion table.

The write circuit 24 writes data in the data storage area 12 in the block 11 of the memory 10. The write circuit 24 further performs the following write operation when the count comparison circuit 25 determines that the number of rewrites of the data storage area 12 has reached the threshold. More specifically, the write circuit 24 first writes out, as an original, an address conversion table held by the address conversion table holding circuit 23 and not written out yet, to the block 11. The write circuit 24 performs the writing so as to switch the free area and the adjacent data storage area in the block 11. The write circuit 24 further writes out, as a copy, an address conversion table updated by the address conversion table update circuit 26 to a block other than the block 11. In the present embodiment, the write circuit 24 is provided as an example of a writing unit that writes the address conversion table.

When the write circuit 24 writes data in the data storage area 12 in the block 11 of the memory 10, the count comparison circuit 25 counts the number of rewrites of the data storage area 12 and compares the result with the threshold to determine whether the number of rewrites has reached the threshold.

The address conversion table update circuit 26 updates the address conversion table held in the address conversion table holding circuit 23 based on an instruction of the write circuit 24 that has received a notification from the count comparison circuit 25 indicating that the number of rewrites of the data storage area 12 has reached the threshold. Specifically, the address conversion table update circuit 26 causes the address conversion table to indicate a state after the switch of the free area and the adjacent data storage area in the block 11.

Operation of Memory Controller of Present Embodiment

Figure 5:
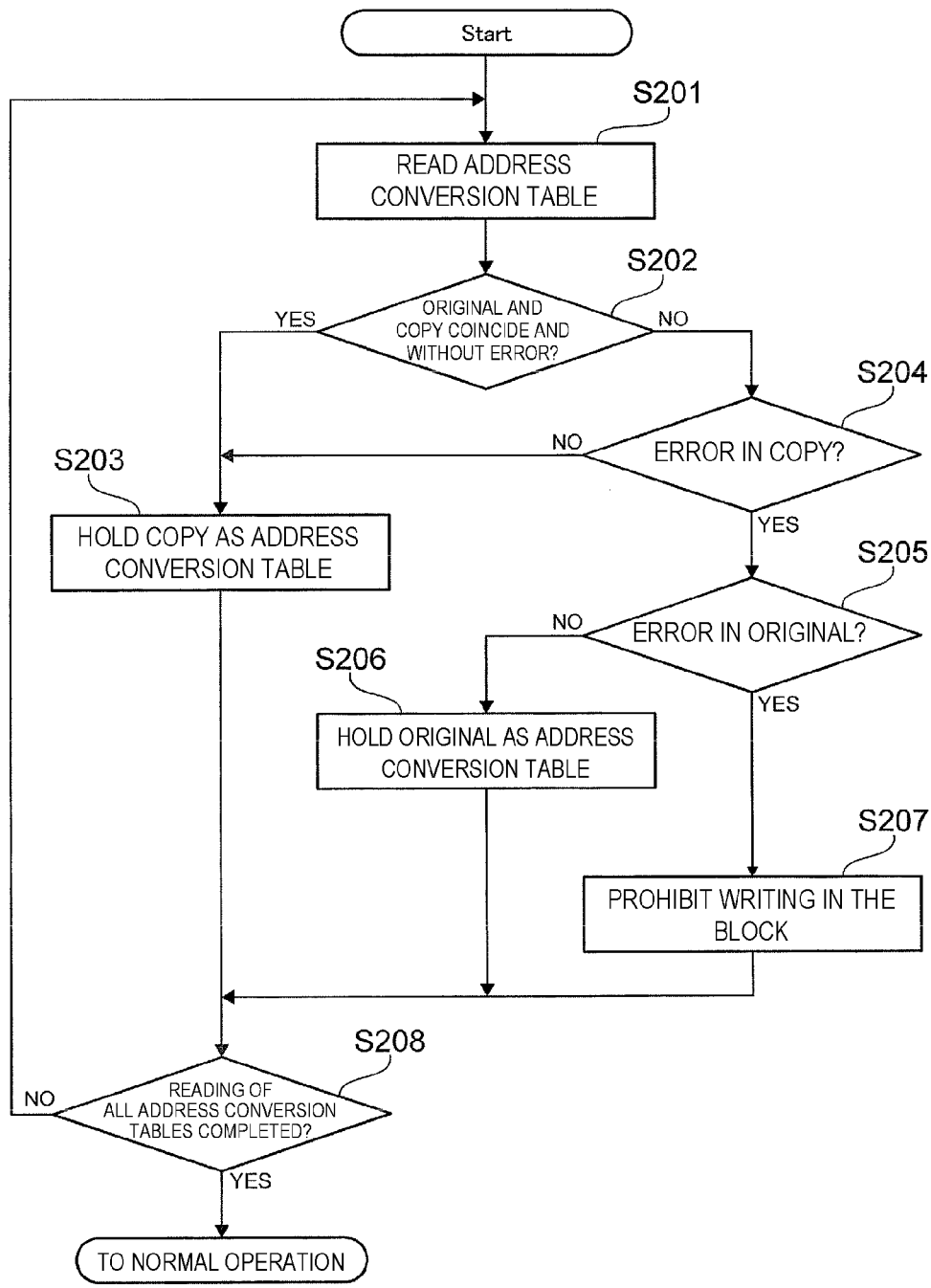
FIG. 5 is a flow chart showing an example of operation during activation of a memory controller according to an embodiment of the present invention.

FIG. 5 is a flow chart showing an example of operation of the memory controller 20 when the memory system is activated.

As illustrated, in the memory controller 20, the read circuit 21 first focuses on one block 11 and reads the original and the copy of the address conversion table for the block 11 from the memory 10 (operation 201). For example, assuming that the target block 11 is the block 11a, the read circuit 21 reads the original a that is the original of the address conversion table for the block 11a from the address conversion table storage area 13a and reads the copy a that is the copy of the address conversion table for the block 11a from the address conversion table storage area 13c.

Next, the comparison inspection circuit 22 compares the original and the copy read in operation 201 and checks whether there is an error based on ECC or parity check function. Then, the comparison inspection circuit 22 determines whether the original and the copy read in operation 201 coincide and there is no error (operation 202).

As a result, if the comparison inspection circuit 22 determines that the original and the copy read in operation 201 coincide and there is no error, the address conversion table holding circuit 23 holds the copy (same as original) as the address conversion table (operation 203).

On the other hand, if the comparison inspection circuit 22 determines that the original and the copy read in operation 201 do not coincide or there is an error, the comparison inspection circuit 22 determines whether there is an error in the copy read in operation 201 (operation 204). If the comparison inspection circuit 22 determines that there is no error in the copy read in operation 201, the address conversion table holding circuit 23 holds the copy as the address conversion table (operation 203).

Further, if the comparison inspection circuit 22 determines that there is an error in the copy read in operation 201, the comparison inspection circuit 22 determines whether there is an error in the original read in operation 201 (operation 205). If the comparison inspection circuit 22 determines that there is no error in the original read in operation 201, the address conversion table holding circuit 23 holds the original as the address conversion table (operation 206).

Furthermore, if the comparison inspection circuit 22 determines that there is also an error in the original read in operation 201, the address conversion table holding circuit 23 holds an indication for prohibiting writing in the target block 11 to avoid breaking the data in the block 11 (operation 207). Note that in this case, error recovery is left up to a process of software.

Subsequently, the read circuit 21 determines whether the address conversion tables for all blocks 11 are read (operation 208). If the read circuit 21 determines that the address conversion tables for all blocks 11 are not read, the read circuit 21 focuses on a block 11 for which the address conversion table is not read and repeats the process of operations 201 to 207. Further, if the read circuit 21 determines that the address conversion tables for all blocks 11 are read, the process moves to normal operation.

Although this example of operation is based on the assumption that there is ECC or parity check function, there may not be ECC or parity check function. In that case, if it is determined that the original and the copy coincide in operation 202, the copy (same as original) can be held as the address conversion table. If it is determined that original and the copy do not coincide in operation 202, the process can proceed to operation 207 by skipping operation 204 and operation 205, and an indication for prohibiting writing in the target block 11 can be held.

Figure 6:
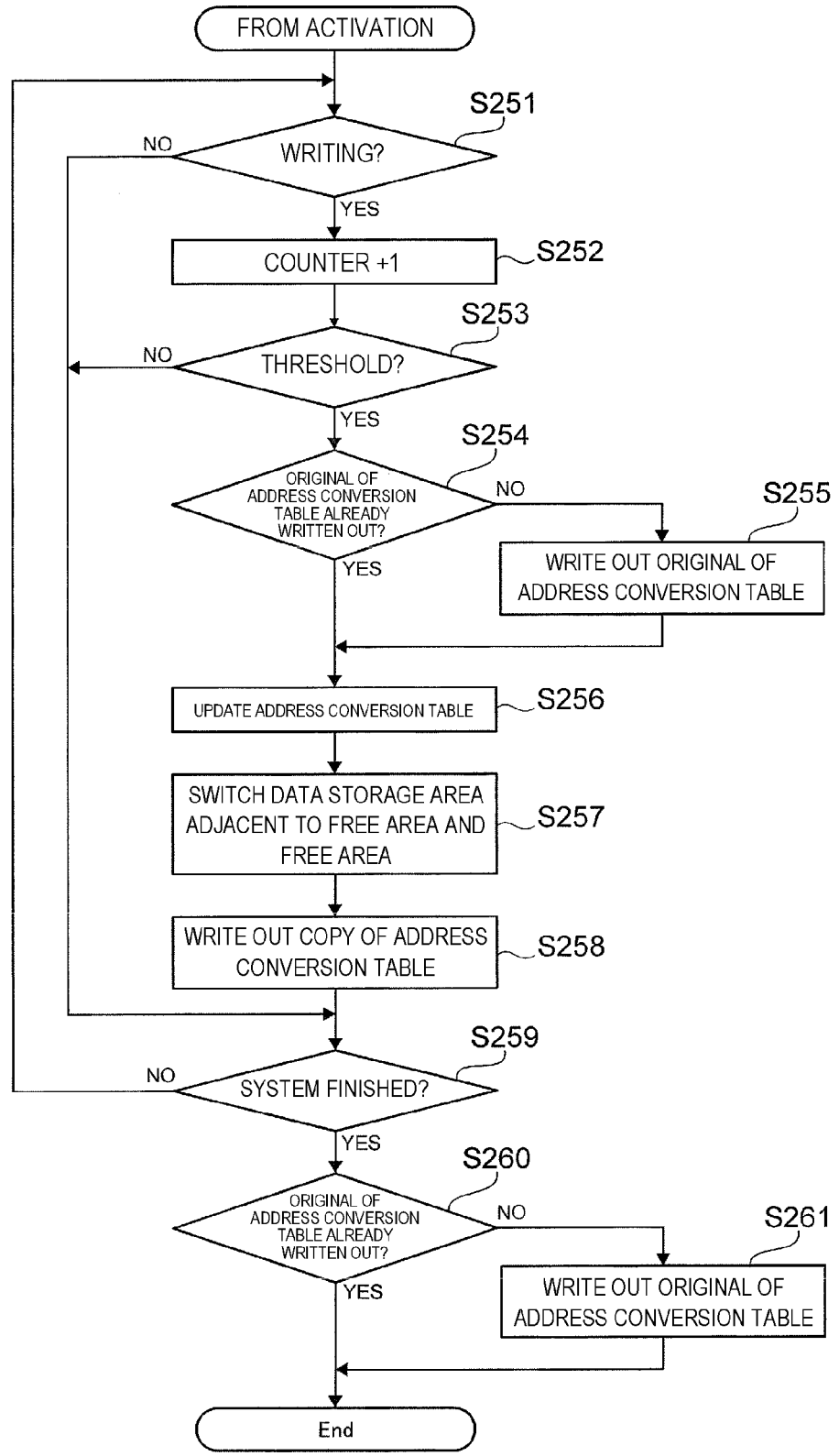
FIG. 6 is a flow chart showing an example of operation during normal time of the memory controller according to an embodiment of the present invention.

FIG. 6 is a flow chart showing an example of operation of the memory controller 20 when normal operation is performed after activation of the memory system.

As illustrated, in the memory controller 20, the write circuit 24 first determines whether there is writing in the data storage area 12 in any block 11 (operation 251). If the write circuit 24 determines that there is writing in the data storage area 12, the count comparison circuit 25 counts up the number of rewrites in the data storage area 12 in the block 11 (operation 252) and determines whether the number of rewrites has reached the threshold (operation 253).

If the count comparison circuit 25 determines that the number of rewrites has reached the threshold, the write circuit 24 determines whether the address conversion table held in the address conversion table holding circuit 23 is already written out as an original (operation 254). Here, the fact that the address conversion table is already written out as an original can be stored in, for example, the address conversion table holding circuit 23 when the address conversion table is written out as an original. As a result, if it is determined that the address conversion table is not written out as an original yet, the write circuit 24 writes out the address conversion table as an original to the address conversion table storage area 13 in the block 11 (operation 255). For example, if the written block 11 is the block 11a in FIG. 4, the original a that is the original of the address conversion table for the block 11a is written in the address conversion table storage area 13a. On the other hand, if it is determined that the address conversion table is already written out as an original, the write circuit 24 does not write out the address conversion table as an original.

Next, the address conversion table update circuit 26 updates the address conversion table held in the address conversion table holding circuit 23 (operation 256). Specifically, since there is a transition in the state shown in FIG. 1 when the number of rewrites reaches the threshold, the identification information indicating the state is advanced by one.

Next, the write circuit 24 switches the free area and the adjacent data storage area 12 in the block 11 (operation 257). Following this, a copy of the address conversion table is written in the address conversion table storage area 13 of another block 11 by bank interleave (operation 258). For example, if the written block 11 is the block 11a in FIG. 4, the copy a that is a copy of the address conversion table for the block 11a is written in the address conversion table storage area 13c.

Subsequently, the write circuit 24 determines whether a notification for ending the system is received (operation 259). If the write circuit 24 determines that a notification for ending the system is not received, the process returns to operation 251. If the write circuit 24 determines that a notification for ending the system is received, the write circuit 24 determines whether the address conversion table held in the address conversion table holding circuit 23 is already written out as an original (operation 260). As a result, if the write circuit 24 determines that the address conversion table is not written out as an original yet, the write circuit 24 writes out the address conversion table as an original to the address conversion table storage area 13 in the block 11 (operation 261). On the other hand, if the write circuit 24 determines that the address conversion table is already written out as an original, the process ends.

In this example of operation, for example, after the copy of the address conversion table for the block 11a is written out to, for example, the block 11c in operation 258 when the number of rewrites of the block 11a reaches the threshold, the original of the address conversion table corresponding to the block 11a is written out to the block 11a in operation 255 when the number of rewrites of the block 11a reaches the threshold again. However, the original of the address conversion table for the block 11a may be intentionally written out to the block 11a before the number of rewrites of the block 11a reaches the threshold again.

Alternatively, the original of the address conversion table corresponding to the block 11a may be intentionally not written out before the number of rewrites of the block 11a reaches the threshold again, and the writing may be suspended until the original is written out together when the copy of the address conversion table for the block 11c is written out to the block 11a as the number of rewrites of the block 11c reaches the threshold. In this case, detecting writing of the copy of the address conversion table for the block 11c in the block 11a and writing the original of the address conversion table for the block 11a in the block 11a once the writing is detected can be added to FIG. 6.

As described, in the present embodiment, the original and the copy of the address conversion table are held in different blocks 11. In this way, even if one of the address conversion tables cannot be read for some reasons, the address conversion table of the other can be read and restored.

Further, in the present embodiment, the process is executed in the order of switching the free area and the adjacent data storage area, writing out the copy of the address conversion table, and writing out the original of the address conversion table. In this way, even if the process is suspended by a trouble such as power interruption, the address conversion table can be restored. Particularly, the copy is written out earlier than the original of the address conversion table in the present embodiment. Therefore, even if there is a trouble caused by power interruption or the like before the original of the address conversion table is written out, the data loss is limited to the area in the copy, and the loss of entire data can be prevented.

Furthermore, in the present embodiment, the original of the address conversion table for a block and the copy of the address conversion table for another block are merged and written in one block by single write operation. This can suppress generation of a penalty in performance and chip size caused by holding the copy of the address conversion table for another block in a block. Specifically, the necessity of intentionally writing out the original of the address conversion table corresponding to a block to the block can be reduced, and an increase in the address conversion table storage area can be suppressed to reduce the overhead.

Furthermore, the arrangement of the copy of the address conversion table in another block allows update by continuous writing based on the bank interleave. Therefore, the overhead associated with the update of the address conversion table can be reduced.

Although the original and the copy of the address conversion table are stored in one address conversion table storage area 13 in the present embodiment, the arrangement is not limited to this. Two address conversion table storage areas 13 may be provided in the block 11, and the original and the copy of the address conversion table may be stored in each of the two address conversion table storage areas 13. Therefore, it can be considered that the present embodiment is designed to store the original and the copy of the address conversion table in one block 11.

In the present embodiment, one of the two replications of the address conversion table stored in the block 11 corresponding to the address conversion table is the original, and the other replication stored in a block 11 other than the block 11 corresponding to the address conversion table is the copy. However, the arrangement is not limited to this. Instead of defining the original and the copy, it can be considered that one of the two replications of the address conversion table is stored in the block 11 corresponding to the address conversion table, and the other is stored in a block 11 other than the block 11 corresponding to the address conversion table.

Although the embodiment is used to describe the present invention, the technical scope of the present invention is not limited to the embodiment. It is apparent to those skilled in the art that various changes can be made and alternative modes can be adopted without departing from the spirit and the scope of the present invention.

REFERENCE SIGNS LIST

10 . . . memory,
11a, 11b, 11c . . . blocks,
12a, 12b, 12c . . . data storage areas,
13a, 13b, 13c . . . address conversion table storage areas,
20 . . . memory controller,
21 . . . read circuit,
22 . . . comparison inspection circuit,
23 . . . address conversion table holding circuit,
24 . . . write circuit,
25 . . . count comparison circuit,
26 . . . address conversion table update circuit.

The invention claimed is:

1. A method of writing, in a non-volatile memory, an address conversion table for wear leveling of the non-volatile memory, the method comprising:
   writing, in a first block, one replication of a first address conversion table for wear leveling of the first block of the non-volatile memory;
   writing, in the first block, a replication of a second address conversion table for wear leveling of a second block other than the first block of the non-volatile memory;
   writing, in a third block, a replication of a third address conversion table for wear leveling of the third block other than the first block of the non-volatile memory; and
   writing, in the third block, another replication of the first address conversion table.

* * * * *